US009573544B1

(12) United States Patent
Ghannam et al.

(10) Patent No.: US 9,573,544 B1
(45) Date of Patent: Feb. 21, 2017

(54) PROTECTIVE STRUCTURES FOR AIR SENSORS IN A VEHICLE BODY STRUCTURE

(71) Applicant: Ford Global Technologies, LLC, Dearborn, MI (US)

(72) Inventors: Mahmoud Yousef Ghannam, Canton, MI (US); Jeffery Hammoud, Dearborn Heights, MI (US); Swadad A. Carremm, Canton, MI (US); Dana Conner, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/833,902

(22) Filed: Aug. 24, 2015

(51) Int. Cl.
B60R 21/0136 (2006.01)
G01L 19/06 (2006.01)

(52) U.S. Cl.
CPC ....... *B60R 21/0136* (2013.01); *G01L 19/0636* (2013.01)

(58) Field of Classification Search
CPC .. B60R 21/0136; G01L 19/00; G01L 19/0038; G01L 19/0636; G01L 19/0645; G01F 3/22; G01F 3/20; G01F 15/12; G01F 15/125

See application file for complete search history.

(56) References Cited

U.S. PATENT DOCUMENTS

| | | | |
|---|---|---|---|
| 5,811,685 A * | 9/1998 | Grudzien, Jr. | G01L 19/0654 73/715 |
| 7,765,866 B2 | 8/2010 | Uchida | |
| 2006/0081043 A1 * | 4/2006 | Silverbrook | B60C 23/0408 73/146 |
| 2006/0090568 A1 * | 5/2006 | Silverbrook | B60C 23/0408 73/753 |
| 2007/0068276 A1 * | 3/2007 | Wanami | G01L 19/0636 73/818 |
| 2007/0089520 A1 * | 4/2007 | Wanami | B60R 21/0136 73/700 |
| 2007/0186672 A1 * | 8/2007 | Friedberger | B64D 43/00 73/802 |

FOREIGN PATENT DOCUMENTS

| | | |
|---|---|---|
| DE | 102013110258 A1 | 4/2014 |
| JP | H09311064 A | 12/1997 |
| JP | 2006105853 A | 4/2006 |
| JP | 2009145191 A | 7/2009 |
| JP | 2010084591 A | 4/2010 |

\* cited by examiner

*Primary Examiner* — Drew Brown
(74) *Attorney, Agent, or Firm* — Frank A. MacKenzie; Brooks Kushman P.C.

(57) ABSTRACT

A pair of vehicle door panels defines a cavity. An air sensor has an air inlet protruding into the cavity and senses an air pressure within the cavity. A shield covers the air inlet, has at least one side wall extending away from the air inlet, and defines a chamber configured to collapse in response to an increase in the air pressure to excite the air sensor.

16 Claims, 3 Drawing Sheets

US 9,573,544 B1

PROTECTIVE STRUCTURES FOR AIR SENSORS IN A VEHICLE BODY STRUCTURE

TECHNICAL FIELD

The present disclosure relates to apparatus to protect vehicle air sensors from foreign objects.

BACKGROUND

A restraint system in a vehicle can detect an impact of the vehicle from multiple directions. Based on the direction of the impact, the restraint system may use different sensors to detect the impact. Forward and rear collisions may use accelerometers to detect a sudden change in vehicle acceleration. An impact to a side of the vehicle may use an air pressure sensor located within a cavity formed by an inner door panel and an exterior door panel of the vehicle. The cavity formed by the inner and outer panels is typically not an air tight cavity, but allows for a predetermined flow of air in to and out of the cavity. This flow of air may be associated with many conditions including a change in a temperature around the vehicle, a change in an elevation of the vehicle, or a movement of a door of the vehicle such as closing the door. When the vehicle experiences an impact to a side door of the vehicle, the exterior door panel may compress thus causing a reduction in an area of the cavity between the inner and outer door panels. The reduction in the area of the cavity results in an increase in air pressure within the cavity. The increase in air pressure is in relation to the ambient air pressure around the vehicle. An air sensor may measure this increase in air pressure and output a signal indicative of the increase in air pressure. The signal may trigger a restraint control module to inflate a side air bag.

SUMMARY

A door assembly includes a pair of panels forming a cavity therebetween, an air sensor having an air inlet protruding into the cavity and configured to sense a pressure within the cavity, and a shield. The shield is disposed over the air inlet, has at least one side wall extending away from the air inlet, and defines a chamber configured to collapse in response to an increase in the pressure to excite the air sensor.

A vehicle includes a door assembly defining a cavity, an air sensor configured to sense a pressure within the cavity, and a flexible shield covering the air sensor, defining a chamber within the cavity, and configured to collapse in response to an increase in the pressure. The vehicle also includes a controller configured to, in response to a signal from the air sensor indicating an increase in the pressure greater than a threshold, command deployment of an airbag.

A door assembly includes an inner panel joined with an exterior panel to form a cavity therebetween, an air sensor supported by the inner panel and configured to sense an air pressure in the cavity, and a shield. The shield covers the air sensor, defines a chamber within the cavity, and is configured to fold to reduce a volume of the chamber in response to an increase in the air pressure.

DETAILED DESCRIPTION

Figure 1:
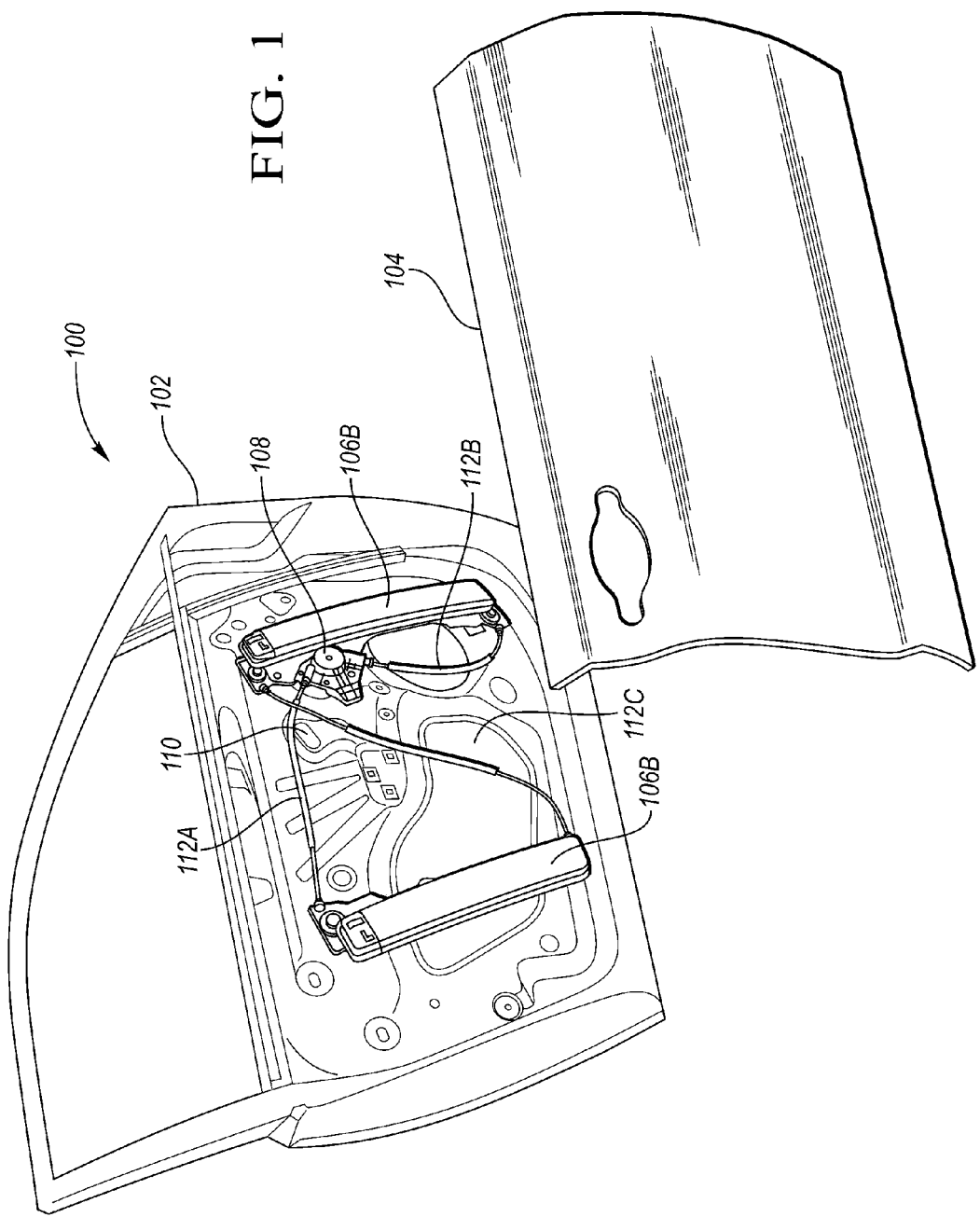
FIG. 1 is a side view of a door assembly illustrating an inside of the assembly.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Air pressure sensors are used in many automotive systems including engine control and safety system. One application of an air pressure sensor is to predict an impact with a side of a vehicle such as a collision with a side door panel. The body of the vehicle may include door assemblies such as a driver-side door assembly, passenger-side door assembly, a rear door assembly, or other vehicle door assembly. A door assembly may be constructed of an inner panel and an outer panel. The outer panel may also be referred to as an exterior panel. The inner and exterior panels are typically joined at a peripheral of the panels creating a cavity in between the inner and exterior panel. The cavity between the inner and exterior panels is typically not air tight and may include an opening to permit air to pass between the cavity and an outside of the door assembly. The opening may allow a small volume of air to freely pass between the cavity and the outside, such as a change in air pressure due to a change in temperature or a change in elevation. The opening may be sized such that a small change in air pressure would not cause a deformation of the door assembly. In the event of an impact to the side of the vehicle such as in a vehicular collision, the rapid deformation of the exterior panel may create a sudden large change in air pressure within the cavity. The opening is typically not large enough to compensate for this sudden large change in air pressure.

An air pressure sensor may be used to monitor the air pressure within the cavity of the door assembly. Upon an impact collision with the door assembly in which the exterior panel is compressed, the compressive force creates a high pressure within the cavity monitored by the air sensor. The air sensor may be configured to measure the pressure in the cavity and output a signal to a controller including a processor, or Restraint Control Module (RCM). The controller may deploy an airbag, such as a side curtain airbag, into a vehicle passenger compartment based on the pressure or the change in pressure measured by the air sensor. Placement of the air sensor involves multiple considerations including protection of the sensor from weather and debris.

An air pressure sensor typically includes a silicone gel over an electronic sensing circuit and an air inlet. The silicone gel and air inlet is susceptible to damage from debris including ants. The attraction of ants to silicone gel increases when the silicone gel is warmed. A method of warming silicone gel is the use of a heat source. One type of heat source that increases the attraction of ants to the silicone gel is heat generated by an electronic circuit such as the electronic circuit used for sensing of the air pressure. Air pressure sensors, also called pressure crash sensors, have had issues with the silicone gel being damaged by ants in vehicles. The damage includes blockage or restriction of the air inlet, removal of the silicone gel allowing impurities to be deposited on the electronic circuit, or the electronic circuit being short circuited. This typically results in operational errors and communication disruption between the air sensor and controller or RCM.

The silicone gel material in an air pressure sensor is an attractive material for ants to nest. A sensor electric circuit produces heat and an electrical charge. The heat and charge produced by the circuit creates an environment attractive for ants. An air flow around an air inlet port of the air sensor and in through the air inlet port is similar to an air flow in an ant tunnel. A geometry of the air inlet of the air sensor is similar to a geometry of tunnels and paths used by ants in nature. A typical size of an ant that is known to disrupt an air sensor is 2.0 mm. The use of a shield having perforations having a size less than 2.0 mm, such as 1.0 mm, may aid in preventing ants from entering the air inlet thus gaining access to the air sensor. The use of a shield having perforations may be such that small changes in air pressure due to a change in temperature or a change in elevation of the vehicle may pass through the perforations. The use of a screen or mesh may be used to prevent debris such as ants from entering the air inlet. However, when placing a screen or mesh over the air inlet, the restriction of the flow of air by the screen may reduce the flow of air through the air inlet and reduce the response time of the sensor in detecting the increase in pressure that results from a side impact collision with a door assembly. The use of the shield having perforations covering the air sensor allows an equal or larger opening area, namely the number and size of the perforations in comparison to the air inlet of the air sensor.

The use of a shield to protect the air sensor and air inlet is a cost effective way to increase reliability while maintaining operational performance. A minimum amount of air flow through the nozzle is needed to produce effective pressure changes that can be transmitted as electronic signals by the sensor. The use of a collapsible perforated shield over the air sensor allows small changes in air pressure to pass to the air sensor via the perforations, and in the event of a sudden large change in air pressure, the shield collapses to transfer the change in air pressure to the sensor covered by the shield.

FIG. 1 is a side view of a door assembly 100 illustrating an inside of the assembly. The door assembly 100 includes an inner door panel 102 also referred to as a door frame and an exterior door panel 104. The inner door panel 102 is coupled with the exterior door panel 104 also called an outer door panel to form a cavity therebetween. The inner and outer panels 102, 104 may be made of steel, or may be made of a lightweight material—such as aluminum alloy, magnesium alloy or composite. The inner panel 102 includes an interior side that faces the cabin and an exterior side that faces the outer panel 104. Affixed to the exterior side of the inner door panel 102 is a window regulator that includes a front widow guide 106A, a rear window guide 106B, a crank assembly 108, and cables 112A, 112B, and 112C. An air sensor may be coupled to the inner door panel 102. The air sensor may be mounted on the interior side of the inner door panel 102 or an exterior side of the inner door panel 102. An air sensor mounted on the interior side of the inner door panel 102 allows for an air inlet of the air sensor to have access to the air pressure. This may be via a hole in the inner door panel 102 in which a portion of the air sensor protrudes through the hole into the cavity. A shield assembly 110 is shown supported by the inner door panel 102. The shield is used to protect an air sensor under the shield from debris including an ant. When the inner door panel 102 and exterior door panel 104 are joined during manufacturing, it may be difficult to service components and mechanisms located between the inner and outer door panels. Also, components between the inner and outer door panels 102 and 104 must be a minimum distance away from each other so that one component does not interfere with functionality. For example, the shield assembly 110 is designed to be a predetermined distance away from mechanisms within the cavity such as the window cables 112A and 112C.

Figure 2:
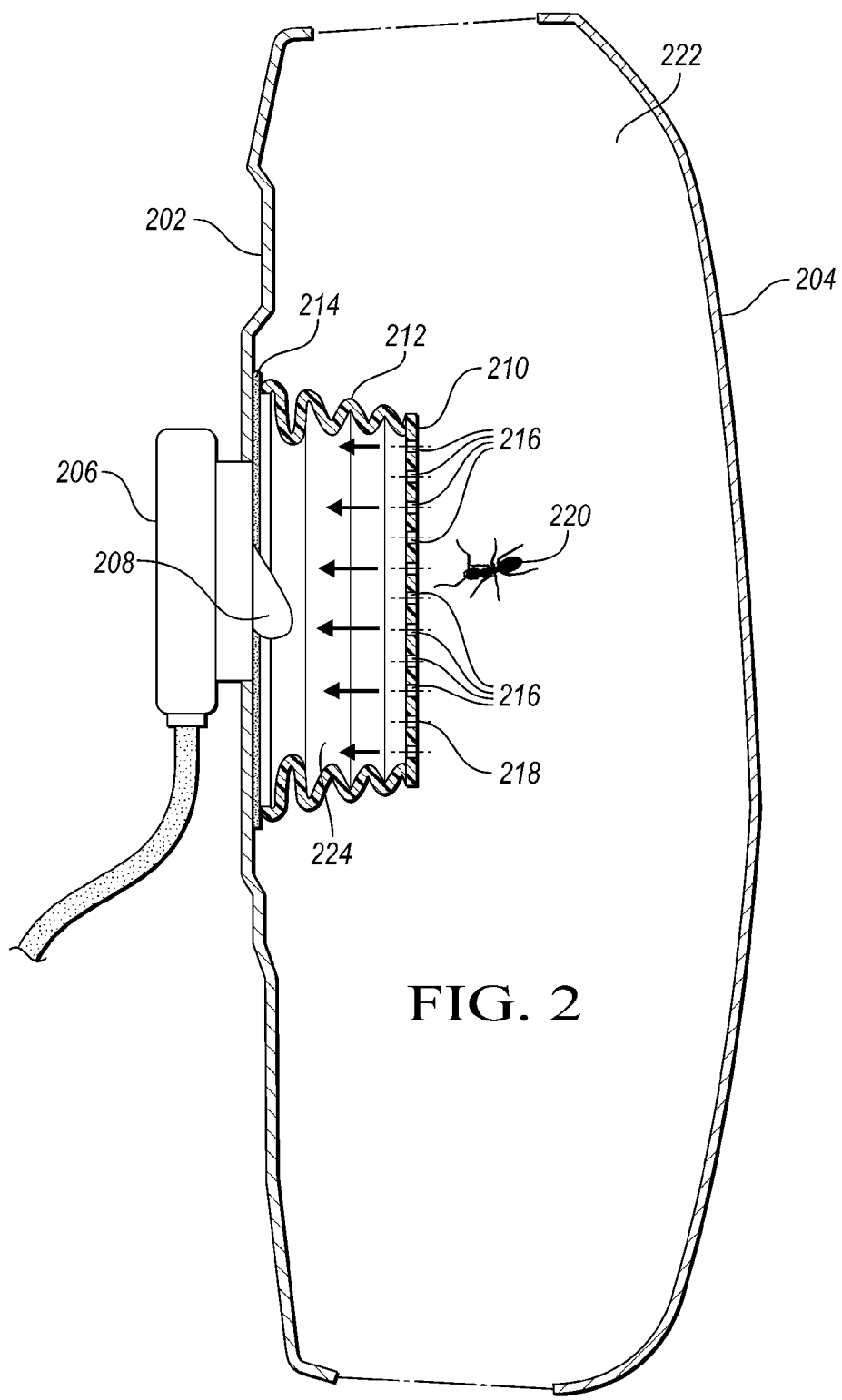
FIG. 2 is a cross sectional side view of the assembly of FIG. 1 illustrating an air sensor having an air inlet and a collapsible shield over the air inlet.

FIG. 2 is a cross sectional side view of the assembly of FIG. 1 illustrating an air sensor 206 having an air inlet 208 and a collapsible shield 210 over the air inlet 208. The inner door panel 202 is coupled with the exterior door panel 204 also called an outer door panel to form a cavity 222 therebetween. The inner and outer panels 202, 204 may be made of steel, or may be made of a lightweight material— such as aluminum alloy, magnesium alloy or composite. The inner panel 202 includes an interior side that faces the cabin and an exterior side that faces the outer panel 204. The interior side of the inner panel 202 supports the air sensor 206 and the air inlet 208 of the air sensor extends into the cavity 222. The collapsible shield 210 is configured to cover the air sensor 206. In this illustration, the collapsible shield 210 is covering the air inlet 208 of the air sensor 206. The air sensor 206 may be disposed on the interior side of the inner panel 202 having the air inlet 208 protrude through the inner panel 202 to the cavity 222. Alternatively, the air sensor 206 may be disposed on the exterior side of the inner panel 202 having the air inlet 208 and air sensor 206 within the cavity 222. Also, the air sensor 206 may be disposed on a structure within the cavity supported by the inner panel 202 or outer panel 204.

The collapsible shield 210 is shown including a corrugated side wall 212, and a top 218. The corrugated side wall 212 is supported by and secured to the exterior side of the inner door panel 202 forming a chamber 224 within the cavity 222. The corrugated side wall 212 may use an adhesive 214, a grommet, a flange or other structure to secure the shield 210 to the inner door panel 202. The flange may be secured with a bolt and nut, a bolt into a threaded hole in the flange, or a threaded hole in the inner door panel 202. The bolt and nut may include a hex head, an allen head, a torqx head, a phillips head, a straight blade head or any other type of driven fastener. The top 218 has a plurality of holes 216 also referred to as perforations or slits to allow air to flow between the cavity 222 and the chamber 224. The plurality of holes 216 may be disposed on the top, the at least one side wall 212, or both. The plurality of holes 216 are configured to allow a predetermined volume of air to move between the cavity 222 and the chamber 224 over a period of time. The predetermined volume per unit of time is also referred to as a predetermined volumetric flow rate. This predetermined volumetric flow rate of air capable of moving between the cavity 222 and the chamber 224 is associated with a change in air pressure of the cavity 222 from a change in temperature, a change in elevation, or conventional motion of the door such as closing the door. A measured air pressure within the cavity 222, and specifically within the chamber 224 by the air sensor, typically will generate a signal indicative of the air pressure.

The collapsible shield includes at least one side wall. For example, the collapsible shield may have a shape of a cone with one side wall of the cone forming the point. The side wall of the cone may be configured with perforations to assist in the transfer of air pressure from the cavity of the door assembly to the chamber defined by the cone such that the air sensor coupled to the chamber may measure the air pressure. The perforations allow a flow of air from the cavity to the chamber. The side wall may be corrugated forming pleats that may allow for easier folding or collapsing of the cone in the event of a large change in air pressure. The side wall may have both pleats and perforations such that small changes of air pressure may pass through the perforations and large changes of air pressure may cause the cone to collapse.

The collapsible shield may be in the shape of a dome or a half of a sphere having one side wall. The side wall of the dome may also be configured with perforations in the side wall or pleats in the side wall, or a combination of both. The collapsible shield may be in the shape of a cylinder with one side wall forming the wall of the cylinder and a top of the cylinder. The side wall of the cylinder may have perforations or may have pleats or a combination of both. The collapsible shield may be constructed in other shapes including a rectangular parallelepiped, a cube, a cuboid, a cone with a flat top, a pyramid, a pyramid with a flat top, or a tube extending perpendicular from the air sensor.

Many of the door components, including the inner and outer panels are stamped separately and are assembled into a door assembly in a plurality of stages. In one stage, the sensor is attached to the inner panel 202. In a subsequent stage, commonly referred to as "door setting" the inner and outer panels 202, 204 are joined together by a hemming process. For example, the outer panel 204 is larger than the inner panel 202 and includes a flange that is typically bent at 90 degrees relative to the main body of the outer panel 202. During hemming, an outer portion of the inner panel 202 is placed against the outer panel 204 near the flange. The flange is folded over the outer portion creating the hem also referred to as a seam, which holds the panels together. Adhesive may be applied to the hem for increased strength and corrosion resistance. After the door is set, accessing components in the cavity 222 may be limited to access openings thus requiring additional time to service. However, small insects 220 and debris are not limited by the access openings as those are typically much larger than the size of the insect 220. The use of the collapsible shield 210 may provide additional protection of the air sensor 206 and air inlet 208 from insects 220.

Figure 3:
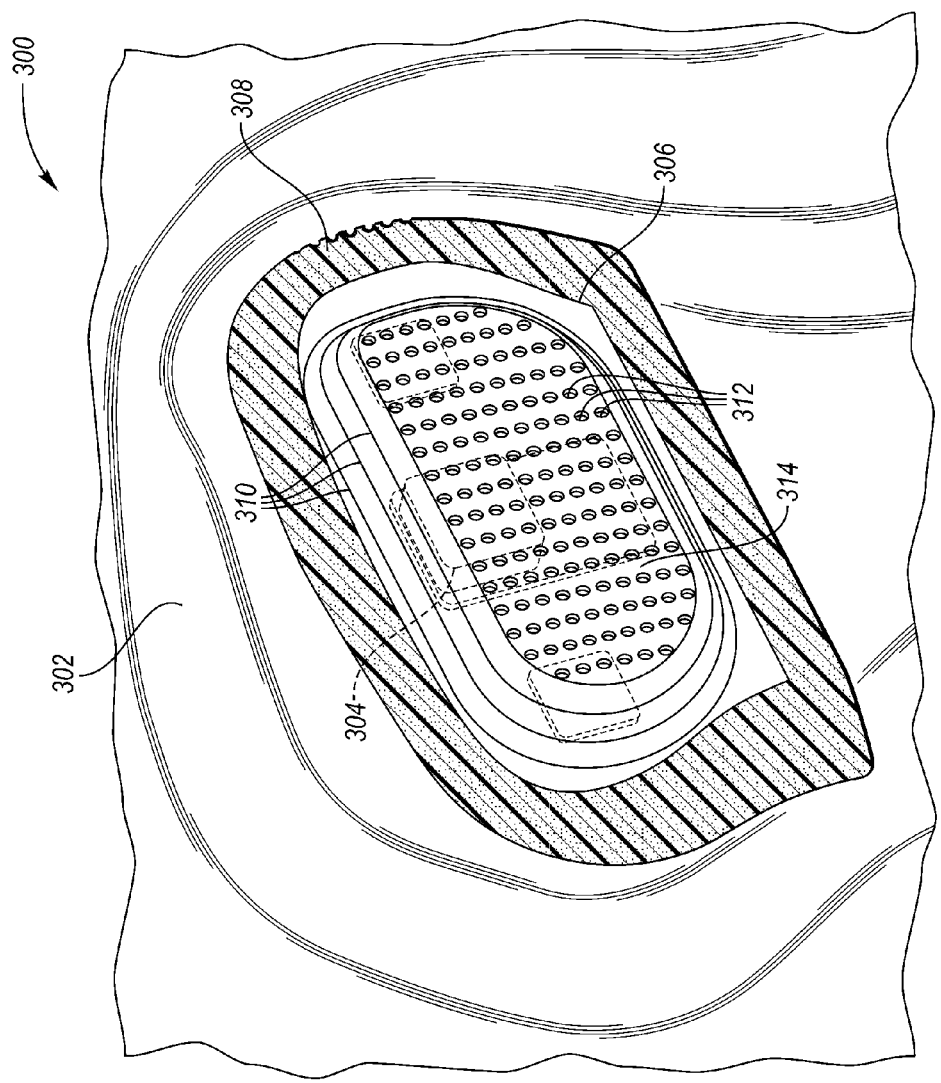
FIG. 3 is an illustration of the collapsible shield on an inner door panel assembly.

FIG. 3 is an illustration of the collapsible shield on an inner door panel assembly 300. An inner door panel 302 has an air sensor 304 mounted to measure an air pressure within a door cavity. To protect the air sensor 304 from debris including ants and other insects, a protective shield 306 is used to cover the air sensor 304. The protective shield 306 includes a skirt area 308 which allows the shield 306 to be coupled with the inner door panel 302. The protective shield 306 includes multiple accordion-like folds 310 so that an area inside the protective shield 306 can increase and decrease with a change in air pressure similar to a bellows. The protective shield 306 may also include multiple perforations 312 on a top surface 314 of the protective shield 306.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A door assembly comprising:
   a pair of panels forming a cavity therebetween;
   an air sensor having an air inlet protruding into the cavity and configured to sense a pressure within the cavity; and
   a shield disposed over the air inlet, having at least one corrugated side wall extending away from the air inlet, and defining a chamber configured to fold to collapse in response to an increase in the pressure to excite the air sensor.

2. The assembly of claim 1, wherein the shield further includes a top defining a plurality of perforations and wherein each of the perforations is less than 1 mm across to facilitate a flow of air between the cavity and chamber.

3. The assembly of claim 1, wherein the shield has a flat top cone shape.

4. The assembly of claim 1, wherein the shield has a dome shape.

5. The assembly of claim 1, wherein the shield has a rectangular parallelepiped shape.

6. The assembly of claim 1, wherein the pair of panels are door panels.

7. A vehicle comprising:
   a door assembly defining a cavity;
   an air sensor configured to sense a pressure within the cavity;
   a flexible shield covering the air sensor, including at least one corrugated side wall configured to fold when collapsing, defining a chamber within the cavity, and configured to collapse in response to an increase in the pressure; and
   a controller configured to, in response to a signal from the air sensor indicating an increase in the pressure greater than a threshold, command deployment of an airbag.

8. The vehicle of claim 7, wherein the at least one corrugated side wall further defines a plurality of perforations and wherein each of the perforations is less than 1 mm across to facilitate a flow of air between the cavity and chamber.

9. The vehicle of claim 7, wherein the shield includes a top defining a plurality of perforations and wherein each of the perforations is less than 1 mm across to facilitate a flow of air between the cavity and chamber.

10. The vehicle of claim 7, wherein the door assembly is a driver side door assembly, a passenger side door assembly, or a rear door assembly.

11. A door assembly comprising:
an inner panel joined with an exterior panel to form a cavity therebetween;
an air sensor supported by the inner panel and configured to sense an air pressure in the cavity; and
a shield covering the air sensor, including a corrugated side wall, defining a chamber within the cavity, and configured to fold to reduce a volume of the chamber in response to an increase in the air pressure.

12. The assembly of claim 11, wherein the corrugated side wall includes a plurality of perforations and wherein each of the perforations is less than 1 mm across to facilitate a flow of air between the cavity and chamber.

13. The assembly of claim 11, wherein the shield includes a top defining a plurality of perforations and wherein each of the perforations is less than 1 mm across to facilitate a flow of air between the cavity and chamber.

14. The assembly of claim 11, wherein the shield has a flat top cone shape.

15. The assembly of claim 11, wherein the shield has a dome shape.

16. The assembly of claim 11, wherein the shield has a rectangular parallelepiped shape.

\* \* \* \* \*